Jan. 8, 1963    H. G. YODER    3,072,223
BRAKE SYSTEM
Filed June 22, 1959
2 Sheets-Sheet 1
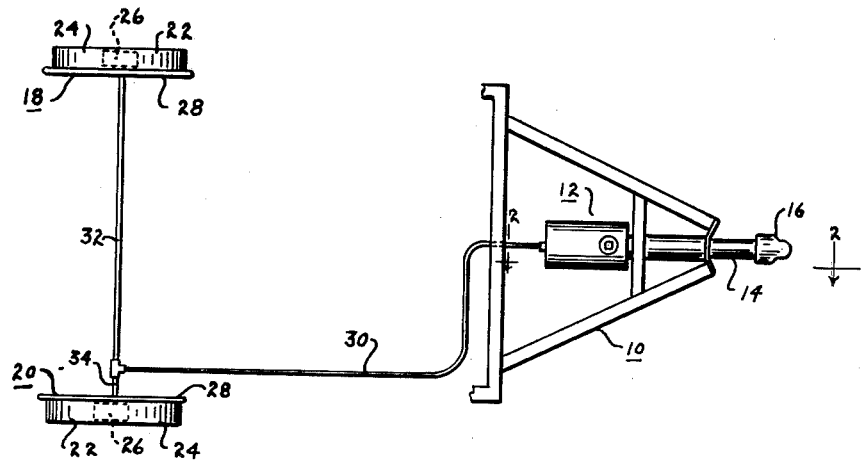
FIG. 1
FIG. 2
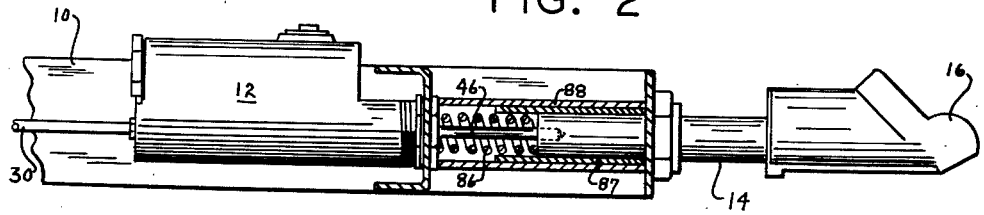
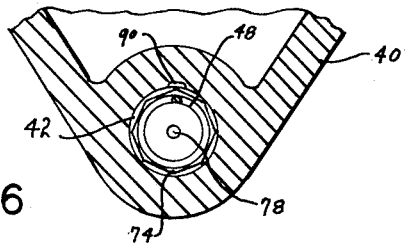
FIG. 6
*INVENTOR.*
HERBERT G. YODER
BY M. A. Hobbs
ATTORNEY Jan. 8, 1963 H. G. YODER 3,072,223
BRAKE SYSTEM
Filed June 22, 1959 2 Sheets-Sheet 2

INVENTOR.
HERBERT G. YODER
BY *M. A. Holder*
ATTORNEY

United States Patent Office 3,072,223
Patented Jan. 8, 1963

3,072,223
BRAKE SYSTEM
Herbert G. Yoder, R.F.D. 3, Bellefontaine, Ohio
Filed June 22, 1959, Ser. No. 822,125
2 Claims. (Cl. 188—112)

The present invention relates to brake systems and more particularly to automatic brake systems for vehicle trailers, mobile homes and the like.

Considerable work has been expended in the past in an effort to develop a satisfactory brake system for vehicle trailers, using the towing and inertia forces exerted on the hitch, which will operate automatically when the power vehicle is decelerated and which will automatically release the brakes on the trailer when the power vehicle is backing the trailer. One of the difficulties encountered in these automatic operations is obtaining effective release of the trailer brakes under all conditions of operation and under various conditions in the brake system, including the degree of wear and adjustment. Another difficulty has been in overcoming the effect of rough terrain varying the towing and inertia forces and occasionally causing rapid shifting between towing and inertia forces on the brake actuator. It is therefore one of the principal objects of the present invention to provide a braking system actuated by the push and pull forces created between the towed and towing vehicles, which releases the brakes when a predetermined reverse force is applied to the towed vehicle by the towing vehicle and which is not affected in operation on rough streets, roads or other uneven terrain over which the towed vehicle is pulled.

Another object of the present invention is to provide a brake actuator for a trailer operated by to and fro forces applied to the tow bar connecting the trailer to an automobile, truck, tractor or the like and embodying a shock absorber action to prevent undesirable and unintentional application and releasing of the brakes.

A further object is to provide a relatively simple and compact automatic brake actuator for a vehicle, which can be readily assembled in operating position on a variety of different sizes and makes of trailers and which can be serviced and maintained in condition to give optimum performance without the use of any special skills, tools or equipment.

Another object of the invention is to provide a fully automatic brake actuator for trailers and the like, which does not require any added connections or linkage to the towing vehicle for complete and effective operation under all normal conditions of vehicle operation.

Additional objects and advantages of the present invention will become apparent from following description and accompanying drawings, wherein:

FIGURE 1 is a diagrammatic illustration of a trailer brake system embodying the present invention, showing a portion of the trailer frame with my brake actuator mounted thereon;

FIGURE 2 is a side elevational view of my brake actuator and a vertical cross sectional view of a portion of the trailer taken on line 2—2 of FIGURE 1, a portion of the actuator being cut away to show certain structural details;

FIGURE 6 is a cross sectional view of the brake actuator taken on line 6—6 of FIGURE 5.

Figure 3:
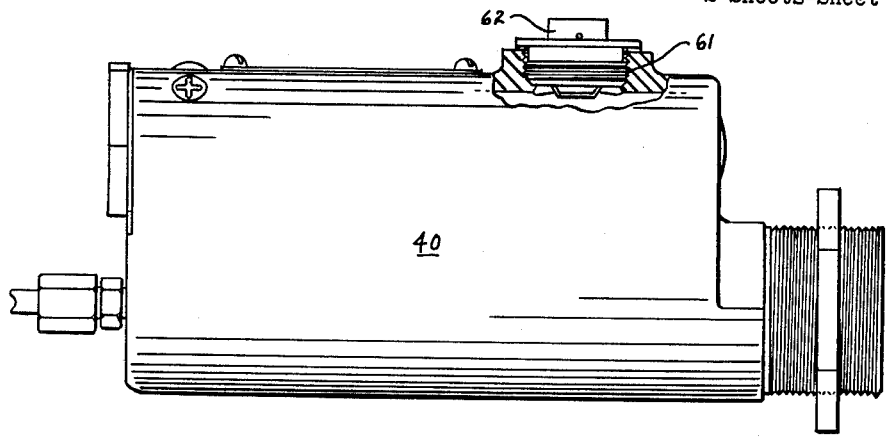
FIGURE 3 is an enlarged side elevational view of the present brake actuator.
Figure 7:
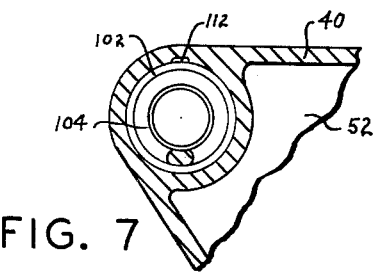
FIGURE 7 is a cross sectional view of the actuator shown in the preceding figures, taken on line 7—7 of FIGURE 5.
Figure 4:
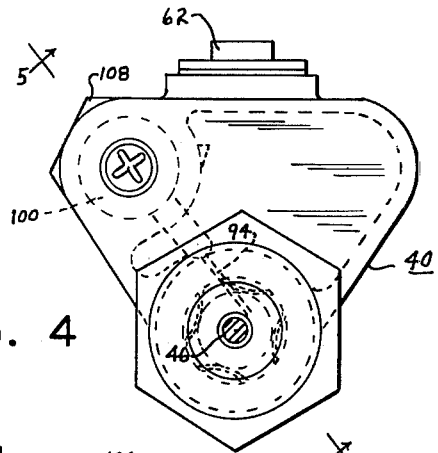
FIGURE 4 is an end view of the brake actuator shown in FIGURE 3.

Referring more specifically to the drawings and to FIGURE 1 in particular, numeral 10 designates a portion of a trailer frame on which the present brake system is mounted, 12 is the brake actuating mechanism, 14 a tow bar for the trailer, 16 a hitch for connecting the tow bar to the towing vehicle (not shown), and 18 and 20 wheel brake assemblies for the left and right wheels, each including brake shoes 22 and 24, hydraulic cylinder 26 and backing plate 28. The two brake assemblies 18 and 20 are connected with the actuating mechanism 12 by main hydraulic line 30 and branch lines 32 and 34, respectively. The particular type and construction of hydraulic wheel brake assemblies used on the towed vehicle are not important in the present invention. Those shown may be considered, for the purpose of the description, as conventional or standard assemblies available from a number of different manufacturers, and will not be described in detail herein. The present brake system and brake actuating mechanism may be used on trailers, mobile homes and other towed vehicles of various sizes, design and construction.

Figure 5:
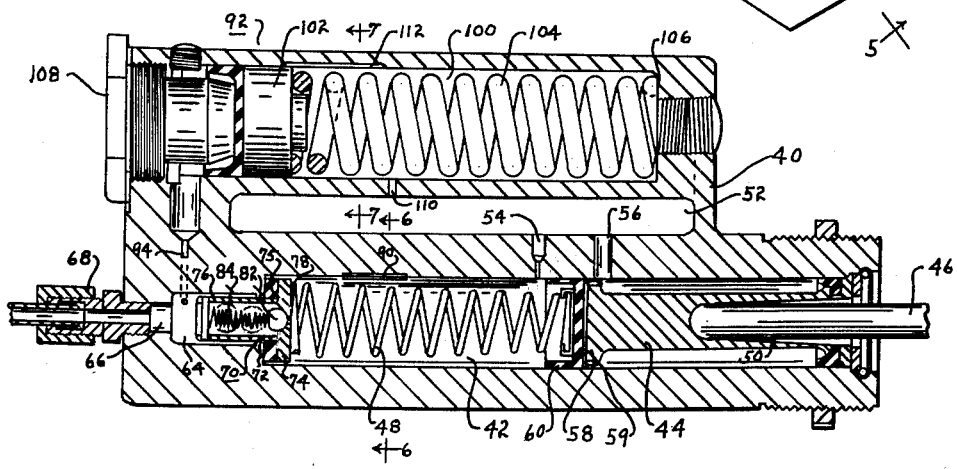
FIGURE 5 is a cross sectional view of the brake actuator shown in the preceding figures, taken on line 5—5 of FIGURE 4.

The present brake actuating mechanism 12 shown in FIGURE 5 consists of a housing 40 having a master cylinder 42 with a piston 44 therein, which is adapted to be moved from the position shown by a push rod 46 to the left end of the cylinder, as viewed in FIGURE 5, and returned by spring 48 to its inoperative position shown in the drawing. The end of rod 46 shown in FIGURE 5 seats in a deep recess 50 in the piston 44 and the other end of the rod is operatively connected to tow bar 14, as will be more fully described hereinafter. Housing 40 contains a hydraulic fluid reservoir 52 connected to cylinder 42 by compensating port 54 in front of piston 44 when the latter is fully withdrawn, and by an input port 56 behind the head portion 58 of piston 44. Ports 59 through head 58 permit fluid to flow from the back to the front side of the head and around gasket cup 60 into the forward end of cylinder 42 when the piston is retracted. Cup 60 functions as a valve to control the flow of fluid through ports 59, preventing the flow from the forward side of the head to the rear side. An opening 61 having a vented cap 62 is provided in the upper side of the housing for filling the reservoir with fluid. For convenience of description in the specification and appended claims, the terms "front" and "forward" side of the piston or end of the cylinder in the actuating mechanism refer to the side of the piston on which the gasket cup is located, and the terms "back," "behind" and "rear" side of the piston or end of the cylinder refer to the side thereof opposite the gasket cup.

Cylinder 42 is connected to the hydraulic fluid lines leading to the brake cylinders by passages 64 and 66 and coupling 68 and the fluid flow through these passages is regulated by inlet and outlet valve assembly 70. The inlet valve consists of a valve element 72 urged to its seat on the end wall by spring 48 and having an enlarged inner end 74 with a gasket 75 for seating on the end wall of cylinder 42 and closing passage 64. End 74 is spaced from the side walls of the cylinder and is centered with respect to passage 64 by the close proximity of the side wall of cylinder 42. Stem 76 is hollow and is connected to cylinder 42 by a port 78, which is closed while the brakes are off by an outlet valve consisting of a ball 82 urged to its seat around port 78 by spring 84. The valve assembly 70 performs the function of sealing the master cylinder from the lines during the bleeding operation and maintaining a predetermined minimum pressure, for example, three to four pounds of pressure on the line and wheel cylinders at all times, to assure a positive seal at the wheel cylinder cup packing and to avoid leakage. For initial actuation of the brake piston 44, sufficient force must be applied by tow bar 14 to overcome springs 48 and 84 and a spring 86 reacting between the inner end of bar 14 and the adjacent end of housing 40. The tow bar 14 and sleeve 87 reciprocate in tube 88.

One of the important features of the present actuating mechanism is the automatic brake release when the towing vehicle endeavors to back the towed vehicle. In the present type of automatic braking system, the brakes are applied either by a more rapid deceleration of the towing vehicle than the towed vehicle or by the towing vehicle applying back up pressure on the towed vehicle. In the later situation, if the rearward thrust of the tow bar is sufficient to apply a considerable braking application, the brakes must be released either manually or automatically before the towed vehicle can be effectively reversed. The present actuator includes a relatively simple and effective brake releasing means which will adapt itself to various conditions of the terrain over which the vehicle is traveling. The brake release mechanism includes the combination of a groove or passage 90 in the wall of cylinder 42 and an accumulator 92 connected to passage 64 by a conduit 94, said groove permitting the fluid in the forward end of cylinder 42 to by-pass piston 44 when the latter approaches the end of its stroke, thus releasing the fluid pressure transmitted to the brake cylinders and accumulator 92. The trailer brakes are, of course, set before piston head 58 reaches bypass position. Groove 90 is longer than the width of piston head 58 so that the groove can communicate freely with both sides of the head when the latter passes over the groove. The combination of groove 90 and accumulator 92 acts as a pop-off valve, relieving the system of extreme shock and possible damage. Since the quantity of fluid required to fully apply the brakes varies depending upon the conditions of the brake cylinders, shoes and drums, the amount of pressure required to advance piston 44 to groove 90 would vary accordingly if the accumulator were not included in the unit.

The accumulator consists of a cylinder 100, piston 102 and spring 104 reacting between the back side of piston 102 and the end wall 106 of the cylinder. The left hand end of the cylinder is closed by a removable cap 108 to permit the spring and piston to be assembled in the cylinder, and the right hand end of the cylinder is connected to the reservoir by a port 110. Spring 104 is calibrated to yield at a predetermined pressure, permitting piston 44 to move to the forward end of cylinder 42 until head 58 is over groove 90. A groove 112 may be provided in the side wall of cylinder 100 spaced rearwardly of piston 102 to permit unloading of the brake system at a predetermined, accurately controlled pressure therein, regardless of the condition of the brake shoes and wheel cylinders. If desired, groove 112 may be omitted, permitting piston 102 to function solely as an accumulator.

In the operation of the present brake system, with the trailer hitched to an automobile, the brakes remain fully off while the trailer is being pulled by the automobile. When the automobile starts to decelerate, the trailer attempts to overtake the automobile and subsantially compression pressure is placed on the tow bar which reacts through rod 46 to apply pressure on piston 44, forcing the hydraulic fluid in cylinder 42 through lines 30, 32 and 34 to the wheel cylinders, thus applying the trailer brakes. Simultaneously, fluid is forced through conduit 94 into the accumulator, moving piston 102 until the hydraulic pressure in the lines is balanced by the pressure of spring 104 on piston 102. Any subsequent change in force on hitch 16, displacing fluid in or out of accumulator cylinder 100, must move the fluid through passage 94 and past valve seat 74 and ball valve 82. The elastic movement of the hitch, as hitch thrust varies, and the work done in displacing fluid into the accumulator past these valves, have a damping or shock absorbing effect which reduces the tendency of the trailer to lung back and forth on the hitch, and consequently smooths the action of the trailer brakes. In normal operation, the piston head 58 does not advance up to groove 90 and there is no bypassing of brake fluid.

When the towing vehicle applies pressure on the tow bar to back the trailer, the spring 86 may sustain the thrust if the trailer backs up easily as, for example, if it is on a smooth level surface. If considerable force is required to back the trailer, the hydraulic pressure in the lines to the wheel cylinders and in cylinder 100 in front of piston 102 is increased, and the trailer brakes will be set. As piston 102 is retracted by continuing pressure, piston 44 advances in cylinder 42 until the fluid in front of the latter piston can flow through groove 90 by-passing head 58 and releasing the pressure in the wheel cylinders, and consequently releasing the trailer brakes. This occurs smoothly and almost imperceptibly to the driver. Thereafter the trailer can be backed without any interference from the brakes. As the pressure on the tow bar is released, springs 86 and 48 return piston 44 to the position shown in FIGURE 5, and during the return stroke, fluid behind the piston head 58 flows through ports 59 around cup 60 into the front portion of cylinder 42.

Although only one embodiment of the present invention, with a modification thereof, has been illustrated and described in detail herein, various modifications and changes may be made without departing from the scope of the invention.

I claim:

1. In a brake system for a towed vehicle; a brake actuating mechanism, including a housing, a master cylinder in the housing, a reservoir in the housing above said cylinder, a piston in said cylinder having a head on the forward end and a recessed portion adjacent and behind said head, a conduit connected to the forward end of said cyliner for conveying fluid therefrom to the vehicle brakes, a spring loaded outlet valve in said conduit, an inlet valve in the forward end of said cylinder, a spring in said cylinder reacting between said piston head and said inlet valve, ports connecting said reservoir with said cylinder on opposite sides of said head when said piston is fully withdrawn from the forward end of the cylinder, said ports providing selective fluid communication between the reservoir and said recessed portion, ports through said head for flow of fluid from said recessed portion into the forward end of said cylinder when said piston is being withdrawn from said forward end, a longitudinally movable tow bar for connecting the towed vehicle to a towing vehicle, a spring for urging said bar toward the towing vehicle, a rod connecting said bar with said piston for urging said piston toward the forward end of the cylinder when a predetermined pressure is placed on said bar, an axial groove in the wall of said cylinder near the forward end thereof operable for by-passing fluid from forwardly of said head into said recessed portion when the piston reaches a predetermined advanced position in the cylinder, a second cylinder in said housing, a second piston in said second cylinder, a spring in said second cylinder urging said second piston toward one end thereof, a fluid passageway connecting said conduit with said spring loaded outlet valve and said second cylinder on the side of said second piston opposite said last mentioned spring, an axial groove in the wall of said second cylinder displaced from the said one end of said second cylinder and operable for establishing a by-pass within the said second cylinder around said second piston when said second piston is spaced a predetermined distance from the said one end of said second cylinder upon overcoming the urging of said last mentioned spring.

2. A brake system according to claim 1 in which there is an axial groove in the wall of said second cylinder displaced from the said one end of said second cylinder and operable for establishing a bypass within the said second cylinder around said second piston when said second piston is spaced a predetermined distance from the said one end of said second cylinder, there being passage means communicating said second cylinder with said reservoir in the region of the rearmost end of the said axial groove in said second cylinder.

References Cited in the file of this patent

UNITED STATES PATENTS

| | | |
|---|---|---|
| 1,268,452 | Goodyear | June 4, 1918 |
| 2,091,904 | Baumann | Aug. 31, 1937 |
| 2,149,189 | Shaffer | Feb. 28, 1939 |
| 2,162,029 | Paul | June 13, 1939 |
| 2,407,156 | Horne | Sept. 3, 1946 |
| 2,571,323 | Yoder | Oct. 16, 1951 |
| 2,637,977 | Seppman | May 12, 1953 |
| 2,698,069 | Henry | Dec. 28, 1954 |
| 2,746,574 | Smith et al. | May 22, 1956 |
| 2,827,918 | Fisher | Mar. 25, 1958 |
| 2,848,074 | Puddy | Aug. 19, 1958 |